United States Patent Office 3,425,293
Patented Feb. 4, 1969

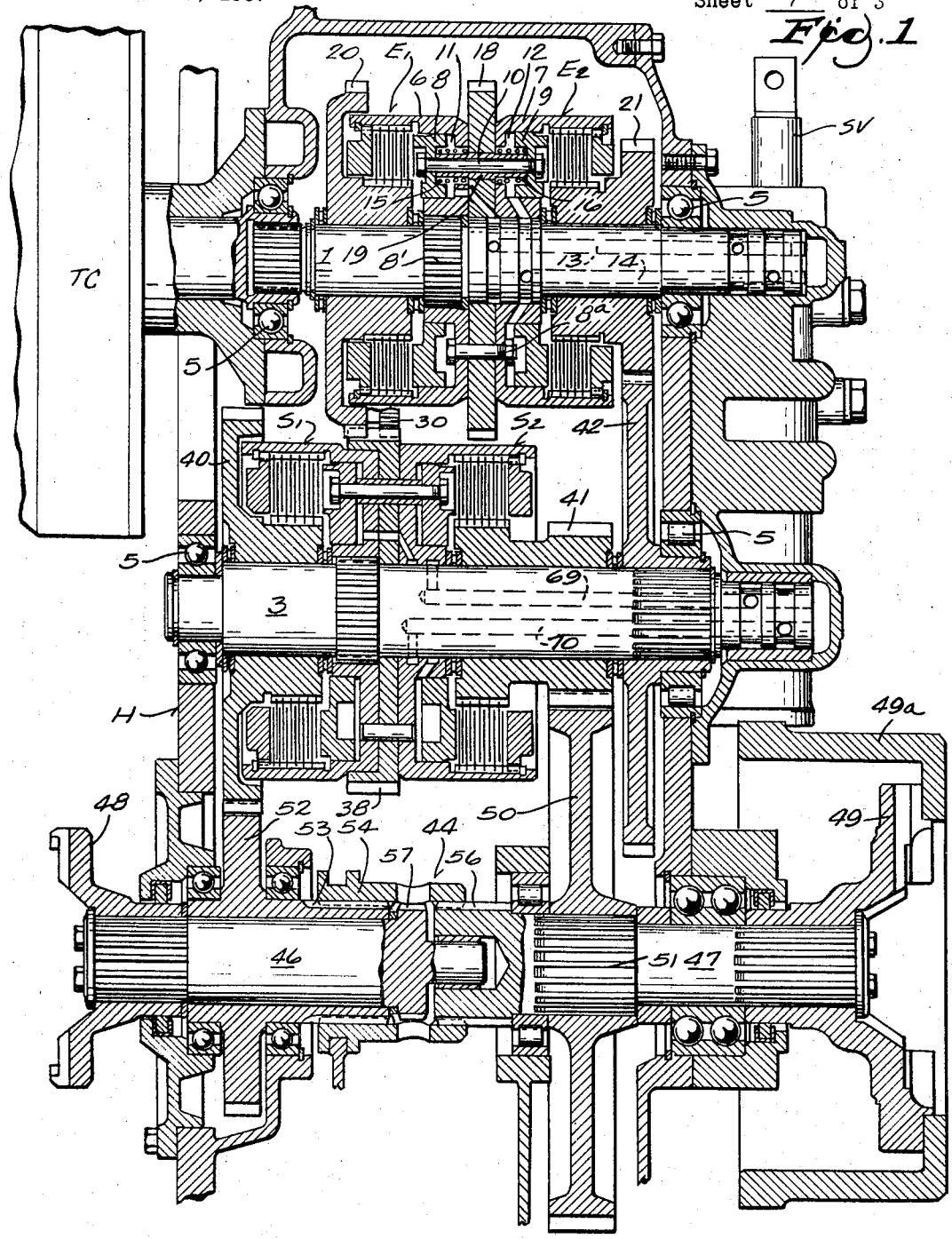

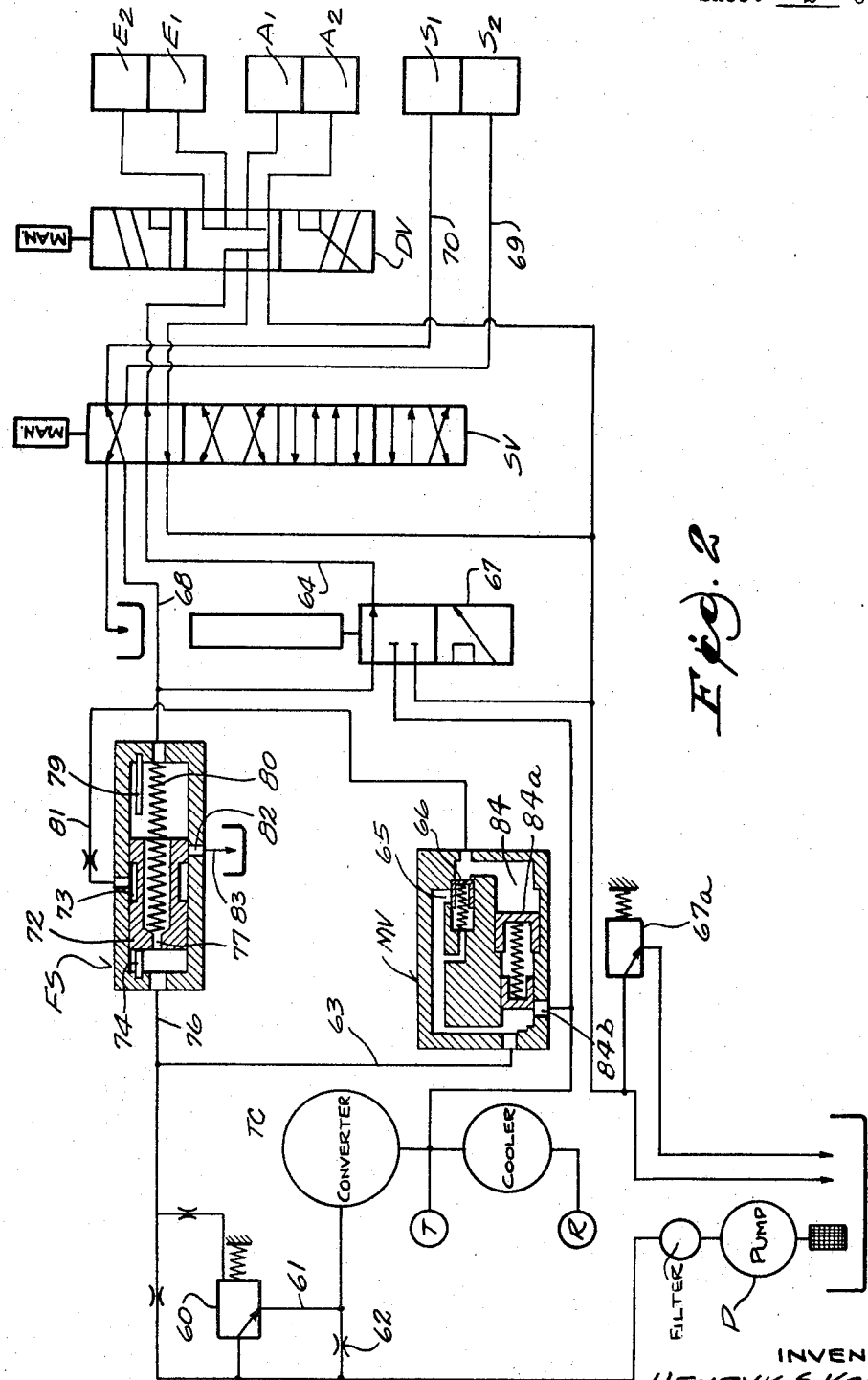

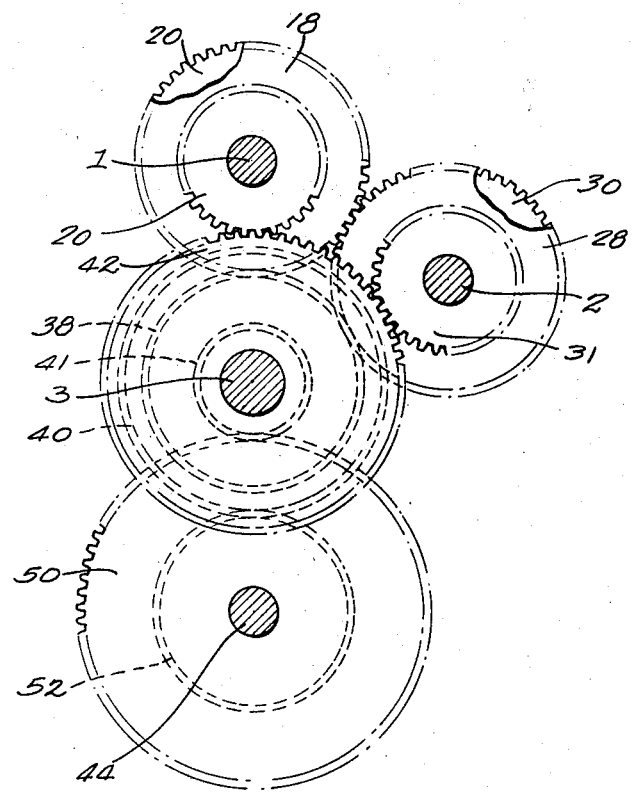

3,425,293
POWER TRANSMISSION AND CONTROL SYSTEM
THEREFOR
Henryk S. Krawczyk, Brussels, and Horst G. Steinhagen, Waterloo, Belgium, assignors to Twin Disc, Incorporated, a corporation of Wisconsin
Filed Feb. 13, 1967, Ser. No. 615,575
U.S. Cl. 74—360                14 Claims
Int. Cl. F16h 3/10; F16d 67/00

ABSTRACT OF THE DISCLOSURE

Power transmissions using a plurality of hydraulically actuated clutches for gear selection for direction and speed, and a hydraulic system for control thereof. The control system includes a modulating valve for the hydraulic clutch actuator which valve acts in combination with a flow sensing valve, the flow sensing valve acting to insure proper operation of the modulating valve and a particularly smooth shift. The flow sensing valve senses the fluid flow to the clutch when a shift occurs, and this flow sensing valve has means for dumping the fluid from the modulating valve and directly to the sump; in this manner, gradual pressure build-up and very smooth shift of the transmission results.

FIELD OF THE INVENTION

The invention finds particular but not exclusive utility in power trains for use with heavy duty vehicles in which the operation of the hydraulically operated, friction plate clutches must be with a minimum of shock or jerk and this consideration is particularly important in multi-speed power trains.

Power transmissions of the type to which this invention pertains usually have a torque convertor, hydraulically actuated, friction plate clutches for selectively engaging the desired gear combination, and a hydraulic system for such transmissions.

The invention is in the nature of an improvement over the mechanism shown in the U.S. Patent 3,183,385 to C. A. Siler, which issued on May 4, 1965, and which mechanism used a master clutch that could not be modulated but instead required step pressure; a clutch could not be engaged until the one ahead of it was engaged; and also required extra shafts to effect the desired number of speeds and directions and other functions.

Another example of the prior art over which the present invention is an improvement, is the control system of U.S. Patent No. 3,091,976, issued June 4, 1963, to G. W. Johnson et al., wherein the speed clutches were engaged prior to the direction clutches, to avoid shock loads on all clutches.

Prior art devices in general have had shortcomings such as high shock loads and noisy transmissions. It was also difficult to control the rate of pressure rise in the hydraulically actuated clutch elements, which was due, among other things, to the fact that there was considerable flow resistance in the line which prevented proper operation of the hydraulic components such as the modulating valve and actuating pistons, consequently resulting in a hard shift.

SUMMARY

The present invention overcomes the above mentioned difficulties of the prior art devices.

In the transmission provided by the present invention, both the direction and speed range clutches are engaged with modulation provided by the improved hydraulic system.

One aspect of the present invention relates to an improved hydraulic system for a transmission of the above type, which system utilizes a modulating valve for the hydraulic clutch actuators in combination with a flow sensing valve which insures proper operation of the modulating valve. Generally, such a valving arrangement and hydraulic system has resulted in a particularly smooth shift of the transmission. More particularly, the flow sensing valve is placed in the fluid line to the clutch and senses the fluid flow to the clutch when a shift occurs, and includes means for dumping the fluid, which is built up in the cavity behind the actuating piston, directly to the sump. The result is a gradual pressure build-up and a very smooth shift of the transmission.

The present invention provides a novel arrangement of duplex clutches which results in four speed ranges forward and four speed ranges in the reverse direction and does so with a minimum number of parts.

Generally the present invention provides a highly versatile and smoothly operating transmission including a multiplicity of hydraulically actuated friction clutches and including a novel hydraulic system for cooperative action with the above elements in providing a rapid, positive and smooth shift.

These and other objects and advantages of the present invention will appear hereinafter as this disclosure progresses reference being had to the accompanying drawings.

BRIEF DESCRIPTION OF THE DRAWINGS

FIGURE 1 is a longitudinal, cross sectional view through a transmission embodying the present invention;
FIGURE 2 is a hydraulic circuit for the transmission;
FIGURE 3 is a more or less schematic, transverse, cross sectional view taken through FIGURE 1, on a reduced scale, and showing parts removed or broken away for clarity.

DESCRIPTION OF THE PREFERRED EMBODIMENT

Power transmission

In the present transmission, a total of three duplex hydraulic clutches are provided, each having two opposed clutches, making a total of six clutches. The duplex clutches may be of the general type shown in the U.S. Patents 3,243,026 of Mar. 29, 1966; 3,262,531 of July 26, 1966, or 3,245,507 of Apr. 12, 1966, all assigned to an assignee common with the present application.

Two of the clutches E1 and E2 are forward direction clutches and are located on a forward shaft 1, shaft 1 being driven by a torque convertor TC. Two reverse clutches A1 and A2 are located on a reverse direction shaft 2. The remaining two duplex clutches S1 and S2 mounted on the speed shaft 3, and these speed clutches are selectively engageable with the gears associated with the other clutches as will appear.

With the present arrangement, there are four speeds forward and four speeds in reverse, and in any situation two clutches are engaged to give the desired combination.

Both the speed range and direction clutches are engaged with a modulating action due to the operation of a controlled rate of pressure rise valve, commonly referred to as a modulating valve MV, as will appear.

The shafts 1, 2 and 3 are suitably journalled in conventional anti-friction bearing assemblies 5 mounted in the housing H of the transmission.

As the construction of the duplex clutches are generally similar, a detailed reference to each of them will not be made.

The duplex clutch on shaft 1 includes a pair of cylinders 6 and 7 arranged in back to back relationship, cylinder 6 being fixed to shaft 1 by the spline connection 8'. The respective pistons 8 and 9 of the cylinders 6 and 7 are secured together by a series of bolt means 10 for movement as a unit, causing engagement of one clutch and simultaneously disengagement of the other, in the known manner, when their respective chambers 11 and 12 are pressurized with or dumped of fluid. The fluid passages 13 and 14 in the shaft 1 conduct and exhaust fluid to and from the expansible chambers 11 and 12 and are in communication with a source pressure fluid, such as a pump P (FIGURE 2) via valves to be referred to later.

The pistons 8 and 9 are biased toward their neutral position by springs 15 and 16.

The duplex clutch on shaft 1 also includes a central gear 18 rigidly fixed therewith by bolt means 18a and sleeves 19 extend through gear 18 and the cylinders 6 and 7 and have a center hole in which sleeve means 19 can slide. Suitable snap rings hold the cylinders and central gear 18 axially on the shaft for rotation therewith as a single unit.

A pair of gears 20 and 21 are rotatably mounted for rotation on shaft 1 by suitable and conventional sleeve bearings and axially fixed by conventional needle bearings assemblies and snap rings. Gear 20 is mounted adjacent cylinder 6 while gear 21 is mounted adjacent cylinder 7 and conventional interleaved friction plates are splined respectively to the cylinders and gears. Thus when chamber 11 is pressurized, the plates between cylinder 6 and gear 20 are clamped up, clutch E1 engaged, and the gear 20 is driven. When clutch E2 is engaged, gear 21 is driven and gear 20 idles.

It will be noted that shaft 1 and its central gear 18 may rotate even though neither gear 20 nor 21 are being driven.

A similar duplex clutch is arranged on reverse shaft 2, its central gear 28 being in constant mesh with and driven by central gear 18 on shaft 1. Gear 30 and gear 31 on shaft 2 are selectively driven by their respective clutches A1 and A2, when a reverse direction is desired.

The third duplex clutch, having a central gear 38 fixed therewith, is mounted on shaft 3 and its clutches S1 and S2 are selectively engageable to drive their respective gears 40 and 41, both rotatably mounted on shaft 3. A separate, larger gear 42 is fixed to shaft 3 for rotation therewith.

The gears of shafts 1, 2 and 3 mesh as follows. Forward gear 20 on shaft 1 and reverse gear 30 on shaft 2 are in constant mesh with and drive the central gear 38 on shaft 3. Forward gear 21 on shaft 1 and reverse gear 31 on shaft 2 are in constant mesh with and furnish driving power to separate gear 42 fixed on speed shaft 3.

An output shaft 44 is also journalled in the housing on suitable antifriction bearings and comprises two stubs shafts 46 and 47 piloted together at their inner ends.

The outer end of shaft 46 is connected to the front wheels (not shown) of the tractor by means of a universal joint drive, a portion of which is shown at 48. The outer end of shaft 47 is connected to the rear wheels (not shown) of the tractor by means of another universal drive joint, a portion of which is shown at 49. A brake 49a is also provided on the outer end of shaft 47.

An output gear 50 is fixed by spline 51 to stub shaft 47 and is in constant mesh and driven by gear 41 of shaft 3. Another output gear 52 is rotatably mounted on the other stub shaft 46 and is in constant mesh with and derives power from gear 40, when clutch 51 is engaged. Gear 52 has an external spline 53 on its hub.

An internally splined shifting collar 54 is axially slidable on the external spline 53 of gear 52 and spline 56 of stub shaft 47. Collar 54 is also selectively engageable with an external spline 57 on the inner end of shaft 46.

Thus output shaft 47 can be driven by itself (when collar 54 is disconnected from spline 57) to provide a two wheel drive, for example for operation on the road, at all speeds.

A four wheel drive, for working conditions, is also available when both shafts are driven when the collar 54 is shifted to the right (as viewed in the drawings) to engage spline 57 and thereby connect shafts 46 and 47 together.

Thus all speeds are available to drive shaft 47 by itself for two wheel drive, or to drive both shafts 46 and 47 together for four wheel drive.

*Hydraulic system*

The hydraulic circuit includes a pump P, a flow divider valve 60 which apportions the flow of fluid to the torque converter TC via line 61. A by-pass valve or orifice 62 insures the admission of some fluid to the convertor, under any circumstance, to thereby prevent burnout of the convertor.

A controlled rate of pressure rise, or modulating valve MV receives pressure fluid via conduit 63 from the pump and serves to regulate or modulate the fluid pressure which ultimately goes, simultaneously to both the direction and speed clutches. Conduit 64 furnishes modulated pressure fluid to the manually operated, direction selector valve DV, which in turn directs fluid to and from the direction clutches E1, E2, A1 and A2.

A conventional relief valve 65 and orifice 66 are provided in the line, as is a brake pressure actuated dump valve 67 which can dump the entire system, and a pressure regulating lubrication valve 67a.

Modulated pressure is also directed via line 68 to the speed selector valve SV, for consequent fluid distribution and return via lines 69 and 70 connected to the speed clutches S1 and S2.

Valves DV and SV are of the manually operated, spool type; valve SV selecting any one of four speeds and valve DV selecting either forward or reverse direction.

In prior systems, due to the flow resistance in the hydraulic system, the cavity behind the clutch actuating piston did not empty fast enough, or in some cases, not at all, and the modulating valve could not function properly, which resulted in a hard shift.

To overcome this difficulty, a flow sensing valve FS is provided in the fluid line 68 which leads into the clutches, which valve senses the flow into the clutch when shifting occurs. This valve serves to dump the fluid from the cavity behind the control rate of rise piston 84a, directly into the sump, and results in a gradual pressure build-up and smooth shift.

More specifically, the valve FS includes a spool 72 having an annular groove 73. The spool is spring loaded against a stop 74 to block off groove 73 in that position shown. Fluid pressure from the pump P enters the valve FS via conduit 76, flows through orifice 77 in the spool and then out via line 68 to the clutches. Initial flow of fluid into valve FS causes the spool 72 to shift (to the right as viewed in the drawing) and against stop 79 against the action of the spring 80, thus opening line 81 (which is in fluid communication with the cavity 84 in the modulating valve MV) with the sump, via annular groove 73, drain port 82, and conduit 83 thus dumping cavity 84 of the modulating valve.

When the cavity 84 of valve MV, behind the controlled rate of rise piston 84a of valve MV is dumped through valve FS as above mentioned, the piston moves back and pressure in the valve MV drops and results in a gradual pressure build-up and a very smooth shift. Thus the flow sensing valve FS has means to dump fluid and permits the modulating valve MV to dump sufficiently rapidly, thus permitting it to function properly in causing a gradual pressure rise in the clutches.

In other words, when the spool 72 of valve FS is moved to the right due to fluid flow upon operation of a clutch, the cavity 84 in valve MV will be dumped through line 81 and the control rate of rise piston 84a in the lower portion of valve MV will then move to the right under the influence of the pressure in line 63. Movement of the piston 84a to the right would then uncover completely the port 84b in the lower wall of valve MV and fluid in line 63 would pass freely through valve MV, the "cooler" in FIGURE 2, to the reservoir R. This has the desired effect of temporarily reducing the pump pressure, and allows the gradual pressure build up during operation of a clutch.

RÉSUMÉ

The system provided by the present invention permits all selected clutches to be engaged simultaneously with modulation, resulting in a particularly fast shift in a smooth and positive manner.

The transmission provides four speeds in either direction without the need of a master clutch and with a minimum number of gears, shafts and clutches.

Various modes of carrying out the invention are contemplated as being within the scope of the following claims particularly pointing out and distinctly claiming the subject matter which is regarded as the invention.

We claim:

1. A power transmission comprising: a housing; a forward shaft, a reverse shaft and a speed shaft all rotatably mounted in said housing and arranged in parallelism with one another; a duplex clutch on each shaft, each duplex clutch having a pair of hydraulically actuated individual clutches including a cylinder arranged in back to back relationship with a central gear fixed therebetween, said cylinders being fixed with their respective shaft, the central gears of said forward shaft and said reverse shaft being in constant mesh with one another; a pair of gears rotatably mounted on each shaft, one gear adjacent each individual clutch and releasably driven thereby; one gear on each of said forward shaft and said reverse shaft being in constant mesh with the central gear on said speed shaft, a separate gear fixed on said speed shaft, the other gear of said pair of gears on each of said forward shaft and said reverse shaft being in constant mesh with the said separate gear, and an ouput shaft journalled in said housing and having two output gears thereon, the output gears meshing with the pair of gears on said speed shaft.

2. A transmission as defined in claim 1 including, a torque convertor connected to and driving said forward shaft.

3. A transmission as defined in claim 1 further characterized in that said output shaft comprises a pair of axially aligned stub shafts piloted together, one of said output shafts being mounted on one stub shaft and the other output gear being mounted on the other stub shaft.

4. A transmission as defined in claim 3 including, shiftable means detachably connecting said stub shafts together.

5. A power transmission comprising: a housing; a forward shaft, a reverse shaft and a speed shaft all rotatably mounted in said housing and arranged in parallelism with one another; a duplex clutch on each shaft, each duplex clutch having a pair of hydraulically actuated individual clutches including a cylinder arranged in back to back relationship with a central gear fixed therebetween, said cylinders being fixed with their respective shaft, the central gears of said forward shaft and said reverse shaft being in constant mesh with one another; a pair of gears rotatably mounted on each shaft, one gear adjacent each individual clutch and releasably driven thereby; one gear on each of said forward shaft and said reverse shaft being in constant mesh with the central gear on said speed shaft, a separate gear fixed on said speed shaft, the other gear of said pair of gears on each of said forward shaft and said reverse shaft being in constant mesh with the said separate gear, an output shaft journalled in said housing and having two stubs shafts piloted together at their inner ends, means at the outer end of each stub shaft for taking power therefrom, an output gear fixed on one of said stub shafts, a second output gear rotatably mounted on the other of said stub shafts, the output gears meshing with the pair of gears on said speed shaft, and shiftable means detachably connecting said stub shafts together.

6. A transmission as defined in claim 5 including a torque converter connected to and driving said forward shaft.

7. A hydraulic circuit for a power transmission comprising: a plurality of hydraulically actuated clutches which are selectively controlled for determining direction and speed of an output shaft, a direction selector valve for admitting fluid to other of said clutches, a modulating valve for regulating fluid flow to both said direction and speed selector valves, a source of pressure fluid for furnishing fluid to said direction and speed selector valves under the influence of said modulating valve, and a flow sensing valve between said source and said selector valves for sensing fluid flow to said clutches, said flow sensing valve having means for dumping fluid from said modulating valve when clutches are to be engaged whereby the pressure of the fluid furnished to the selector valves is temporarily reduced to permit a gradual pressure build up during engagement of a clutch.

8. A circuit as set forth in claim 7 further characterized in that said means of said flow sensing valve comprises a spring biased and shiftable spool.

9. A circuit as defined in claim 8 further characterized in that said spool has a central passage through which pressure fluid flows from said pump to said selector valve.

10. A power transmission, hydraulic circuit comprising: a plurality of hydraulically actuated duplex clutches which are selectively controlled for determining direction and speed of a power transmission output shaft, a direction selector valve for admitting fluid to some of said clutches, a speed selector valve for admitting fluid to other of said clutches, a modulating valve for regulating fluid flow simultaneously to both said direction and speed selector valves, a source of pressure fluid for furnishing fluid to said direction and speed selector valves under the influence of said modulating valve, and a flow sensing valve between said source and said speed selector valve for sensing fluid flow to said clutches, said flow sensing valve having means for dumping fluid from the modulating valve when clutches are to be engaged whereby the pressure of the fluid furnished to the selector valves is temporarily reduced to permit a gradual build up during engagement of a clutch.

11. A circuit as set forth in claim 10 further characterized in that said means of said flow sensing valve comprises a spring biased and shiftable spool.

12. A circuit as defined in claim 11 further characterized in that said spool has a central passage through which pressure fluid flows from said pump to said selector valve.

13. A power transmission comprising: a housing; a forward shaft, a reverse shaft and a speed shaft all rotatably mounted in said housing and arranged in parallelism with one another; a duplex clutch, on each shaft, each duplex clutch having a pair of hydraulically actuated individual clutches including a cylinder arranged in back to back relationship with a central gear fixed therebetween, said cylinders being fixed with their respective shaft, the central gears of said forward shaft and said reverse shaft being in constant mesh with one another; a pair of gears rotatably mounted on each shaft, one gear adjacent each individual clutch and releasably driven thereby; one gear on each of said forward shaft and said reverse shaft being in constant mesh with the central gear on said speed shaft, a separate gear fixed on said speed shaft, the other gear of said pair of gears on each of said forward shaft and said reverse shaft being in constant mesh with the said separate gear, and an output shaft journalled in said housing and having two output gears thereon, the output gears meshing with the pair of gears on said speed shaft; a direction selector valve for admitting fluid to said clutches on said forward and reverse shafts, a speed selector valve for admitting fluid to said clutches on said speed shaft, a modulating valve for regulating fluid flow to both said direction and speed selector valves, a source of pressure fluid for furnishing fluid to said direction and speed selector valves under the influence of said modulating valve, and a flow sensing valve between said source and said selector valves and having means for dumping fluid from said modulating valve when clutches are to be engaged whereby the pressure of the fluid furnished to the selector valves is temporarily reduced to permit a gradual build up during engagement of a clutch.

14. A power transmission comprising: a housing; a forward shaft, a reverse shaft and a speed shaft all rotatably mounted in said housing and arranged in parallelism with one another; a duplex clutch on each shaft, each duplex clutch having a pair of hydraulically actuated individual clutches including a cylinder arranged in back to back relationship with a central gear fixed therebetween, said cylinders being fixed with their respective shaft, the central gears of said forward shaft and said reverse shaft being in constant mesh with one another; a pair of gears rotatably mounted on each shaft, one gear adjacent each individual clutch and releasably driven thereby; one gear on each of said forward shaft and said reverse shaft being in constant mesh with the central gear on said speed shaft, a separate gear fixed on said speed shaft, the other gear of said pair of gears on each of said forward shaft and said reverse shaft being in constant mesh with the said separate gear, an output shaft journalled in said housing and having two stub shafts piloted together at their inner ends, means at the outer end of each stub shaft for taking power therefrom, an output gear fixed on one of said stub shafts, a second output gear rotatably mounted on the other of said stub shafts, the output gears meshing with the pair of gears on said speed shaft, and shiftable means detachably connecting said stub shafts together; a direction selector valve for admitting fluid to said clutches on said forward and reverse shafts, a speed selector valve for admitting fluid to said clutches on said speed shaft, a modulating valve for regulating fluid flow to both said direction and speed selector valves, a source of pressure fluid for furnishing fluid to said direction and speed selector valves under the influence of said modulating valve, and a flow sensing valve between said source and said selector valves and having means for dumping fluid from said modulating valve when clutches are to be engaged whereby the pressure of the fluid furnished to the selector valves is temporarily reduced to permit a gradual build up during engagement of a clutch.

References Cited
UNITED STATES PATENTS

| | | | |
|---|---|---|---|
| 3,091,976 | 6/1963 | Johnson, et al. | 74—364 |
| 3,102,432 | 9/1963 | Gerst | 74—360 |
| 3,181,385 | 5/1965 | Siler | 74—364 |
| 3,254,541 | 6/1966 | Schou | 74—360 |

DONLEY J. STOCKING, *Primary Examiner.*

HENRY S. LAYTON, *Assistant Examiner.*

U.S. Cl. X.R.

74—364; 192—3.5